(12) United States Patent
Belimpasakis (10) Patent No.: US 8,438,214 B2
(45) Date of Patent: May 7, 2013

(54) METHOD, ELECTRONIC DEVICE, COMPUTER PROGRAM PRODUCT, SYSTEM AND APPARATUS FOR SHARING A MEDIA OBJECT

(75) Inventor: Petros Belimpasakis, Tampere (FI)

(73) Assignee: Nokia Corporation

( * ) Notice: Subject to any disclaimer, the term of this patent is extended or adjusted under 35 U.S.C. 154(b) by 533 days.

(21) Appl. No.: 11/678,235

(22) Filed: Feb. 23, 2007

(65) Prior Publication Data

US 2008/0208974 A1 Aug. 28, 2008

(51) Int. Cl.
*G06F 15/16* (2006.01)

(52) U.S. Cl.
USPC .................. 709/203; 709/224; 709/226

(58) Field of Classification Search .......... 709/203, 709/206, 207, 217–219, 223–226; 715/700–744
See application file for complete search history.

(56) References Cited

U.S. PATENT DOCUMENTS

| | | | |
|---|---|---|---|
| 6,549,922 B1* | 4/2003 | Srivastava et al. ............. 1/1 |
| 6,721,001 B1* | 4/2004 | Berstis .................. 348/231.3 |
| 7,886,024 B2* | 2/2011 | Kelly et al. ................ 709/219 |
| 2002/0147661 A1* | 10/2002 | Hatakama et al. ........... 705/26 |
| 2003/0097410 A1* | 5/2003 | Atkins et al. ............... 709/206 |
| 2005/0010635 A1* | 1/2005 | Schwesig et al. .......... 709/203 |
| 2005/0097173 A1* | 5/2005 | Johns et al. ................ 709/206 |
| 2006/0264209 A1* | 11/2006 | Atkinson et al. .......... 455/422.1 |
| 2007/0047782 A1* | 3/2007 | Hull et al. .................. 382/124 |
| 2007/0112938 A1 | 5/2007 | Belimpasakis |
| 2007/0239867 A1 | 10/2007 | Belimpasakis et al. |
| 2007/0271338 A1* | 11/2007 | Anschutz .................. 709/204 |

FOREIGN PATENT DOCUMENTS

| | | |
|---|---|---|
| EP | 1 550 968 A1 | 7/2005 |
| EP | 1 952 613 | 8/2008 |
| EP | 2 005 690 | 12/2008 |
| GB | 2 399 983 A | 9/2004 |
| KR | 10-2009-0005290 | 1/2009 |
| RU | 2008 143 455 A | 5/2010 |
| WO | WO 00/16221 | 3/2000 |
| WO | WO 2007/057777 A2 | 5/2007 |
| WO | WO 2007/116250 A2 | 10/2007 |

OTHER PUBLICATIONS

Vartiainen, Panu, "Using Metadata and Context Information in Sharing Personal Content of Mobile Users," Master's Thesis, University of Helsinki, Department of Computer Science,; Feb. 27, 2003, pp. 1-74.

(Continued)

*Primary Examiner* — Ruolei Zong
(74) *Attorney, Agent, or Firm* — Alston & Bird LLP (57) ABSTRACT

A method, electronic device, computer program product, system and apparatus are provided for sharing a media object and, in particular for sharing the discussions and comments surrounding the media object. A user's device may automatically keep track of one or more comments and discussions surrounding a particular media object by, for example, storing information associated with those comments and discussions in a data source either internal to or external from the electronic device, such that the stored information is somehow linked to the corresponding media object. When the user attempts to transmit the media object (e.g., upload the media object to an online sharing server, transmit the media object to a friend, or the like), the user's device may automatically gather the stored information associated with that media object and then transmit that information along with the media object.

33 Claims, 5 Drawing Sheets

OTHER PUBLICATIONS

Tuffield, M. et al., "Image annotation with Photocopain," Proceedings of the International Conference on World Wide Web, May 26, 2006, pp. 1-14.
International Search Report for PCT/IB2008/000255, mailed Jul. 18, 2008.
Office Action in corresponding Chinese Application No. 2008800055011 dated Sep. 8, 2010.
Second Chinese Office Action for Chinese Application No. 2008800055011 dated Jan. 20, 2011.

* cited by examiner

METHOD, ELECTRONIC DEVICE, COMPUTER PROGRAM PRODUCT, SYSTEM AND APPARATUS FOR SHARING A MEDIA OBJECT

FIELD

Exemplary embodiments of the present invention relate, generally, to the sharing of media objects and, in particular, to facilitating the sharing of comments and conversations associated with those media objects.

BACKGROUND

With the introduction of websites, such as MySpace, Flickr, Shutterfly, and those associated with other online sharing services, sharing photographs, video clips, audio clips, and other media objects, with friends, family and colleagues has become easier and easier. Using these websites, individuals can upload their media objects so that others can not only view, listen to or watch the media objects, but also engage in commentary or conversations regarding the media objects. There is significant value not only in the media, but also in the discussions that are generated around that media.

However, many discussions regarding the media object may have occurred before the media object was uploaded to the website and/or may be going on concurrently while the media object is posted to the website but outside of the context of the website (i.e., "out-of-bound"). For example, the person responsible for uploading the media object may have also uploaded the media object to several other, separate websites where similar discussions are taking place. In addition, he or she may have sent the media object directly to friends or family members (e.g., using a Multimedia Message Service (MMS) message) prompting a back-and-forth discussion regarding the media object with the recipient (e.g., using Short Message Service (SMS) messages).

Since these separate conversations took place over entirely different media (e.g., MMS, SMS, email, instant messages (IMs), other website, etc.), the content of these discussions is lost, unless the creator (or uploader) of the media object manually uploads the content of the ongoing discussions to the website. This, however, would likely be quite onerous.

A need, therefore, exists for a technique that would facilitate the sharing of comments and conversations surrounding various media objects.

BRIEF SUMMARY

In general, exemplary embodiments of the present invention provide an improvement over the known prior art by, among other things, providing a technique that enables an individual (referred to herein as "the user") to have multiple discussions regarding a particular media object (e.g., photograph, video, audio clip, etc.), while ensuring that the content of one or more of these conversations or discussions is uploaded and maintained on the server associated with an online sharing service to which the user has uploaded the media object (e.g., a server hosting a website, such as Flickr, MySpace, Shutterfly, etc.). In particular, according to one exemplary embodiment, the user's device may automatically collect one or more comments and discussions made using any possible means (e.g., SMS, MMS, email, IMs, etc.) and relating to various media objects. When a media object is then uploaded to a server associated with the online sharing service (referred to herein as "the online sharing server"), the user's device of one exemplary embodiment will automatically upload the corresponding collected discussions and comments along with the media object. In addition, in one exemplary embodiment, once the media object and corresponding discussions have been uploaded, subsequent discussions occurring out-of-bound (i.e., not in the context of the website to which the media object was uploaded) will likewise be automatically uploaded. As used herein the term "automatic" or "automatically" is intended to refer to functions that are performed in an automated manner without further user intervention.

In accordance with one aspect, a method is provided of sharing a media object. In one exemplary embodiment, the method includes: (1) collecting information associated with one or more activities relating to a media object; and (2) linking the information to the media object such that when the media object is transmitted, at least a part of the information is likewise transmitted.

In one exemplary embodiment, the one or more activities include transmitting a comment associated with the media object, receiving a comment associated with the media object, or a combination thereof. The information collected may, in turn, include a comment associated with the media object, a party responsible for making a comment associated with the media object, context information associated with a comment associated with the media object, or a combination thereof.

In another exemplary embodiment, collecting information associated with one or more activities relating to a media object further involves creating a first entry in a data source associated with the media object; and creating an additional entry in the data source for respective activities. The additional entry may include the information associated with the corresponding activity and may be mapped to the first entry.

In one exemplary embodiment, the media object may be uploaded to a server associated with an online sharing service. The method of this exemplary embodiment may further include storing an address associated with a website hosted by the server in the data source mapped to the media object. In addition, the method of this exemplary embodiment may further include automatically uploading information associated with one or more subsequent activities relating to the media object to the server using the address stored in the data source. Prior to uploading the information associated with a subsequent activity relating to the media object to the server, however, in one exemplary embodiment, the information may be authenticated to the online sharing service.

According to another aspect, an electronic device is provided that is configured to share a media object. In one exemplary embodiment the electronic device includes a processor and a memory in communication with the processor that stores an application executable by the processor, wherein the application is configured, upon execution, to: (1) collect information associated with one or more activities relating to a media object; and (2) link the information to the media object such that when the media object is transmitted, at least a part of the information is likewise transmitted.

In accordance with yet another aspect, a computer program product is provided for sharing a media object. The computer program product contains at least one computer-readable storage medium having computer-readable program code portions stored therein. The computer-readable program code portions of one exemplary embodiment include: (1) a first executable portion for collecting information associated with one or more activities relating to a media object; and (2) a second executable portion for linking the information to the media object such that when the media object is transmitted, at least a part of the information is likewise transmitted.

In accordance with another aspect, a system is provided for sharing a media object. In one exemplary embodiment, the system includes a data source, a server capable of receiving information from the data source, and an electronic device. The electronic device may be configured to collect information associated with one or more activities relating to a media object and to store the information in the data source such that the information is linked to the media object. The electronic device may further be configured to upload the media object to the server, wherein the information stored in the data source linked to the media object is automatically uploaded with the media object.

According to still another aspect, an apparatus is provided. In one exemplary embodiment, the apparatus includes: (1) means for collecting information associated with one or more activities relating to a media object; and (2) means for linking the information to the media object such that when the media object is transmitted, at least a part of the information is likewise transmitted.

BRIEF DESCRIPTION OF THE SEVERAL VIEWS OF THE DRAWING(S)

Having thus described exemplary embodiments of the invention in general terms, reference will now be made to the accompanying drawings, which are not necessarily drawn to scale, and wherein:

DETAILED DESCRIPTION

Exemplary embodiments of the present invention now will be described more fully hereinafter with reference to the accompanying drawings, in which some, but not all embodiments of the inventions are shown. Indeed, exemplary embodiments of the invention may be embodied in many different forms and should not be construed as limited to the embodiments set forth herein; rather, these embodiments are provided so that this disclosure will satisfy applicable legal requirements. Like numbers refer to like elements throughout.

Overview:

In general, exemplary embodiments of the present invention provide a method, electronic device, computer program product, system and apparatus for sharing a media object and, in particular for sharing the discussions and comments surrounding that media object. According to one exemplary embodiment, a user's device may automatically keep track of one or more comments and discussions surrounding a particular media object. As discussed in more detail below, in one exemplary embodiment, this may be done by storing information associated with those comments and discussions in a data source that is either internal to or external from the electronic device, such that the stored information is linked to the corresponding media object. When the user attempts to transmit the media object, the user's device of one exemplary embodiment will automatically gather the stored information associated with that media object and then transmit that information along with the media object. For example, in one exemplary embodiment, the user may be uploading the media object to an online sharing server, such as one hosting the website MySpace. When the user uploads the media object, the stored information will likewise be uploaded to the server. In addition, according to one exemplary embodiment, once the media object has been uploaded, one or more subsequent discussions surrounding the media object may likewise be automatically uploaded. As a result of exemplary embodiments, therefore, a user may have multiple conversations regarding the same media object without having to worry about updating the website, to which the user has uploaded his or her media object, with comments exchanged out-of-bound from that website, such as those exchanged directly with a friend or family member.

In another exemplary embodiment, the information associated with one or more activities relating to a media object may likewise be sent directly between users utilizing, for example, a peer-to-peer network connection, radio connection such as Bluetooth, SMS, Email, MMS, Instant Messaging (IM), or the like. In this exemplary embodiment, a user may, for example, send an audio music clip to several users and receive their comments to the song. Upon receiving comments on the song, as discussed above, the user's device may save the comments in association with the song. If and when the user then sends the audio clip to another user, the saved comments may be sent as well enabling this subsequent recipient to benefit from the previously made comments. As a result of this exemplary embodiment, comments can be shared between groups.

Method of Sharing Media Objects and the Discussions Surrounding Them

Figure 1:
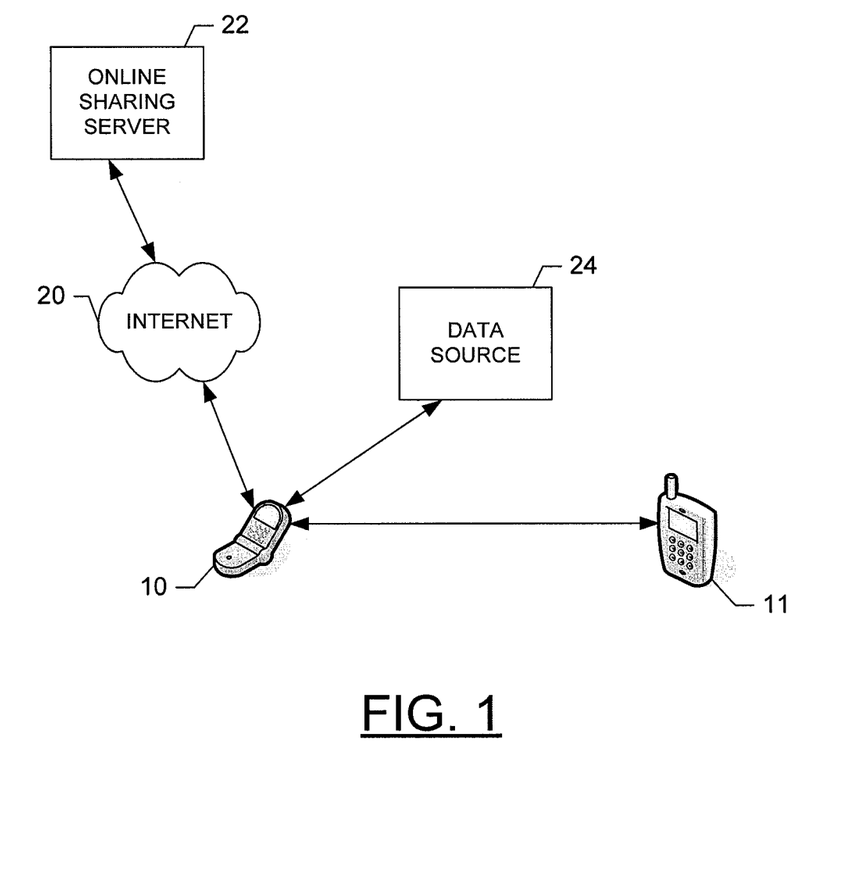
FIG. 1 illustrates a system in which exemplary embodiments of the present invention may be implemented.

A method of sharing media objects and, in particular, the comments and discussions surrounding those media objects will now be described with reference to FIGS. 1 and 2. FIG. 1 provides an example of one system in which the method of exemplary embodiments may be implemented, while FIG. 2 is a flowchart illustrating the actions that may be taken in order to implement this method.

Figure 2:
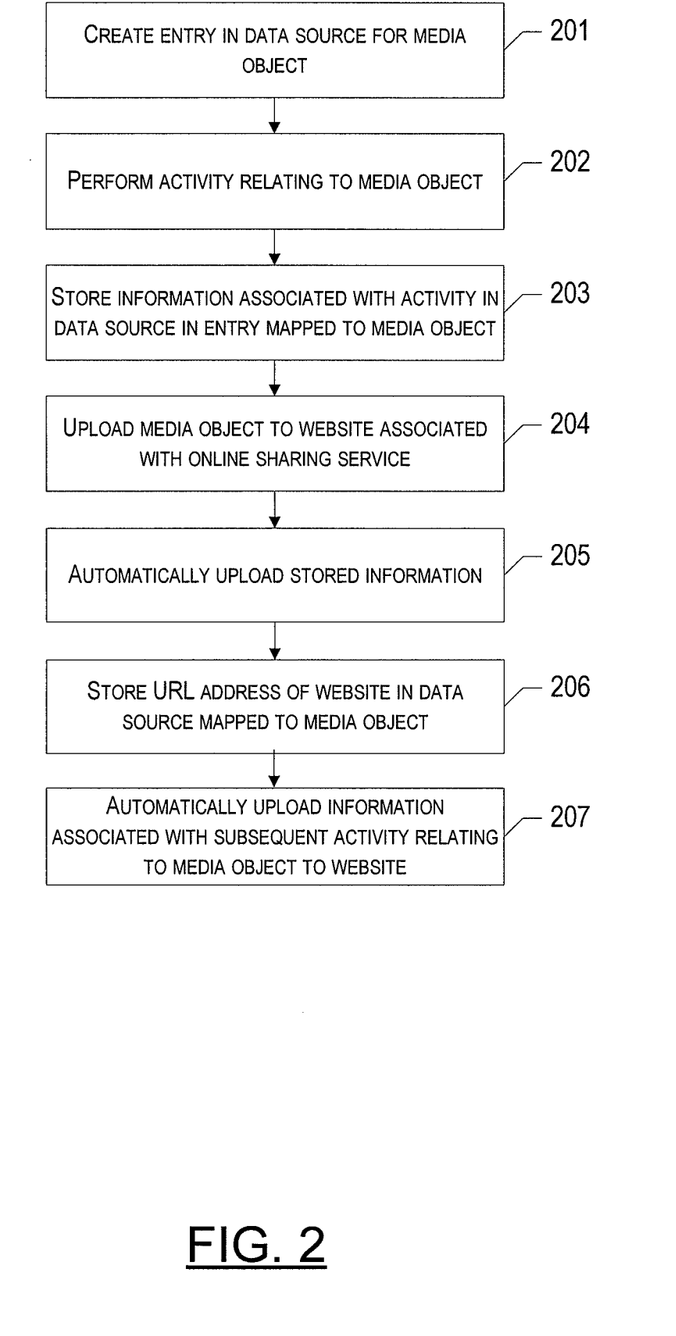
FIG. 2 is a flow chart illustrating a method of sharing a media object in accordance with an exemplary embodiment of the present invention.

As shown in FIG. 2, in one exemplary embodiment, the method may begin at Step 201 where the user's device 10 (e.g., cellular telephone, personal digital assistant (PDA), personal computer (PC), laptop, etc.) and, in particular, a processor operating on the user's device 10, creates an entry in a data source 24 for a particular media object. The data source may, for example, be internal to the electronic device 10, or it may be an external data source which the electronic device 10 can access via a network 20. In one exemplary embodiment, Step 201 may be performed immediately and automatically when the media object is first created or received. Alternatively, Step 201 may occur concurrently with Step 202, wherein an activity relating to the media object is performed. The activity may include, for example, transmitting or receiving the media object and/or a comment associated with the media object using any media including, for example, MMS, SMS, IM, email, and the like. In the latter exemplary embodiment, an entry associated with the media object may not be created in the data source 24 until the media object or a comment associated with the media object is transmitted or received by User A's device 10.

Regardless of when Step 201 is performed, according to one exemplary embodiment, in Step 203, User A's device 10 may store information associated with the activity in the data source 24 in an entry that is linked or mapped to the media object (i.e., to the entry created for the media object). This information may include, for example, a name, nickname or user identification associated with who made the comment, the actual content of the comment, and/or context information associated with the comment including, for example, a date and time when the comment was made, the location of the parties making the comment, and the like. The context information may also include information about the current situation in which the recipient of the media object perused the media object. For example, a user receiving an audio or video of a song could rate the song, and this rating information could be saved along with other information. In addition, if the user receiving a media object was listening to a song while perusing the media object, such as looking at a picture received via MMS, the song information (artist, title) could be included with the comment. This would assist in automatically getting "mood" information associated with a user making a comment.

To illustrate, assume User A operates electronic device 10. User A has a picture of the coliseum stored on his or her electronic device 10. At some point User A and, in particular, User A's device 10, transmits the picture to his/her friend User B's electronic device 11 as an MMS message. Within the transmittal, User A includes the comment "This is from my vacation to Italy." Transmitting the picture and text message to User B's device 11 may constitute an "activity" with regard to Step 202. The information stored, in Step 203, may, therefore, include some combination of "User A," "'This is from my vacation to Italy,'" the specific date and time at which User A transmitted the picture and corresponding text message to User B, the location of User A and/or B, and "User B," indicating to whom the picture and corresponding text message was sent.

According to exemplary embodiments, Steps 202 and 203 may be repeated any number of times prior to moving on to Step 204. For example, continuing with the illustration above, User B may respond to User A by sending an SMS message using his or her electronic device 11. The SMS message may state, for example, "Nice picture. When were you in Italy?" User A's device 10, may then store information associated with User B's SMS message (e.g., "User B." "'Nice picture. When were you in Italy?'" the time at which User B transmitted the SMS message, User B's location at the time of making the comment and/or information associated with User B's "mood" (e.g., the title and artist of a song User B was listening to when viewing the picture)) in the data source 24 as an entry mapped to the picture of the coliseum. User A may thereafter similarly respond via SMS that he or she took the picture in "December of 2006 for Christmas," and User A's device 10 may, again, store information associated with this SMS message in the data source 24 in such a way that it is linked to the entry for the picture of the coliseum.

In one exemplary embodiment, in order for transmission of User B's SMS message to be considered an "activity," for which information may be stored in the data source 24, User B may be required to indicate that he or she agrees to have his or her comments made public. This may be done, for example, by giving User B the option of selecting "Comment," as opposed to simply "Reply" when responding to User A's initial MMS message. In one exemplary embodiment, if User B selects "Comment," he or she agrees to have his or her response posted publicly, and a flag may be set indicating to User A's device 10 that information associated with User B's comment should be added to the data source 24. If, on the other hand, User B selects "Reply," in one exemplary embodiment, the flag may not be set (or an opposite flag may be used), thus indicating to User A's device 10 that the information received is to remain private and, therefore, should not be included in the data source 24. Alternatively, the information may still be included in the data source 24, but with instructions not to subsequently upload the information to any external servers or public locations. In an alternative embodiment, all comments transmitted from User B's device may automatically be saved without requiring that User B first indicate that he or she agrees to their being made public.

Returning to FIG. 2, at some point User A (i.e., User A's device 10) may upload the media object to an online sharing server 22 that is responsible for hosting a website such as Flickr, MySpace, Shutterfly or the like. (Step 204). According to exemplary embodiments of the present invention, when User A's device 10 uploads the media object to the server 22, User A's device 10 may likewise automatically upload the information stored in the data source 24 that is linked to that media object to the same server 22. (Step 205). In the illustration above, this may involve uploading the following to the server 22 in connection with uploading the picture of the coliseum:

2.7.2015 13:15—User A: This is from my vacation to Italy
2.8.2015 08:30—User B: Nice picture. When were you in Italy?
2.8.2015 17:56—User A: December of 2006 for Christmas.

Exemplary embodiments of the present invention, therefore, seek to prevent comments or discussions regarding a particular media object that take place over different media (e.g., MMS, SMS, email, IM, etc.) from being lost without requiring that the user take any affirmative action. As a result of exemplary embodiments, individuals viewing User A's picture of the coliseum on the website to which User A uploaded it, will also be able to see the discussions that took place between User A and User B outside the context of the website. This enhances the experience of future viewers, as well as prevents User A from having to engage in the same discussion more than once (e.g., User A should not have to again respond where and when the picture was taken).

Once the media object and corresponding comments and discussions have been uploaded, in Step 206, a uniform resource locator (URL), or similar, address associated with the website hosted by the online sharing server 22 may be stored in the data source 24 and linked or mapped to the media object. This enables information associated with subsequent activities (e.g., additional comments made by User A or others to whom he or she transmits the media object) to be automatically uploaded to the server 22, in Step 207.

As noted above, exemplary embodiments of the present invention are not limited to uploading media objects and their corresponding comments and discussions to online sharing servers 22. In contrast, if after engaging in discussions or making and receiving comments regarding the media object User A were to transmit the media object to another individual (i.e., User C's device), according to one exemplary embodiment, the discussions and comments that have been linked to that media object in the manner described above, may be transmitted to User C in conjunction with the media object.

As will be understood by those of ordinary skill in the art, the process described above with reference to FIG. 4 may actually begin at Step 204 with the uploading of the media object to the online sharing server 22. In other words, it is not necessary that any discussions relating to the media object take place prior to the media object being uploaded to the server. If no discussions have taken place, the entry associated with the media object discussed with regard to Step 201 may be created in the data source 24 by User A's device 10 upon uploading the media object to the server 22. The URL address associated with the website hosted by the online sharing server 22 may then be added to the data source 24, as indicated above. Information associated with one or more subsequent activities may then be stored in the data source 24 and automatically uploaded to the server 22 based on the stored URL address.

In another exemplary embodiment, not shown, once the media object has been uploaded to the online sharing server 22, in order for information associated with any subsequent activity to be uploaded to the online sharing server 22, the information may first need to be authenticated. For example, assume that the exchange between User A and User B described above actually took place after the media object had been uploaded to the online sharing server 22. In one exemplary embodiment, the MMS message first transmitted by User A to User B and, in particular, User A's device 10 to User B's device 11 may include a link to the website at which the picture of the coliseum is posted, rather than the image itself. Upon receipt, User B's device 11 may, unbeknownst to User B, connect to the website, retrieve the relevant content, and present the content to User B, as if it had been included in the original MMS message. As above, User B may wish to "comment" on the picture. In this exemplary embodiment, however, before User B is allowed to provide a comment that will be uploaded to the online sharing server, User B must first be authenticated to the online sharing service. For example, in one exemplary embodiment, User B's device 11 may be required to provide User B's account information for the particular online sharing service. Once User B has been authenticated, User B's comment may be directly uploaded to the server 22 by User B's device 11, and a link to where it has been uploaded may then be sent to User A's device 10, as opposed to the comment itself, as part of the SMS message. If, on the other hand, User B is not authenticated, the actual comment may be sent to User A's device 10 with the caveat that it cannot be posted or uploaded.

In yet another exemplary embodiment, a third party may be used to authenticate User B and, therefore, User B's comment. For example, if User B does not have an existing account with the online sharing service to which User A uploaded his or her media object, the online sharing service would likely not be able to readily authenticate User B or his or her comment. In this situation, a third party, such as the operator or carrier of the cellular network to which User B is connected, may be able to provide the necessary authentication. In particular, the operator/carrier may act as a trusted intermediary that can vouch for User B to the online sharing service.

Figure 3:
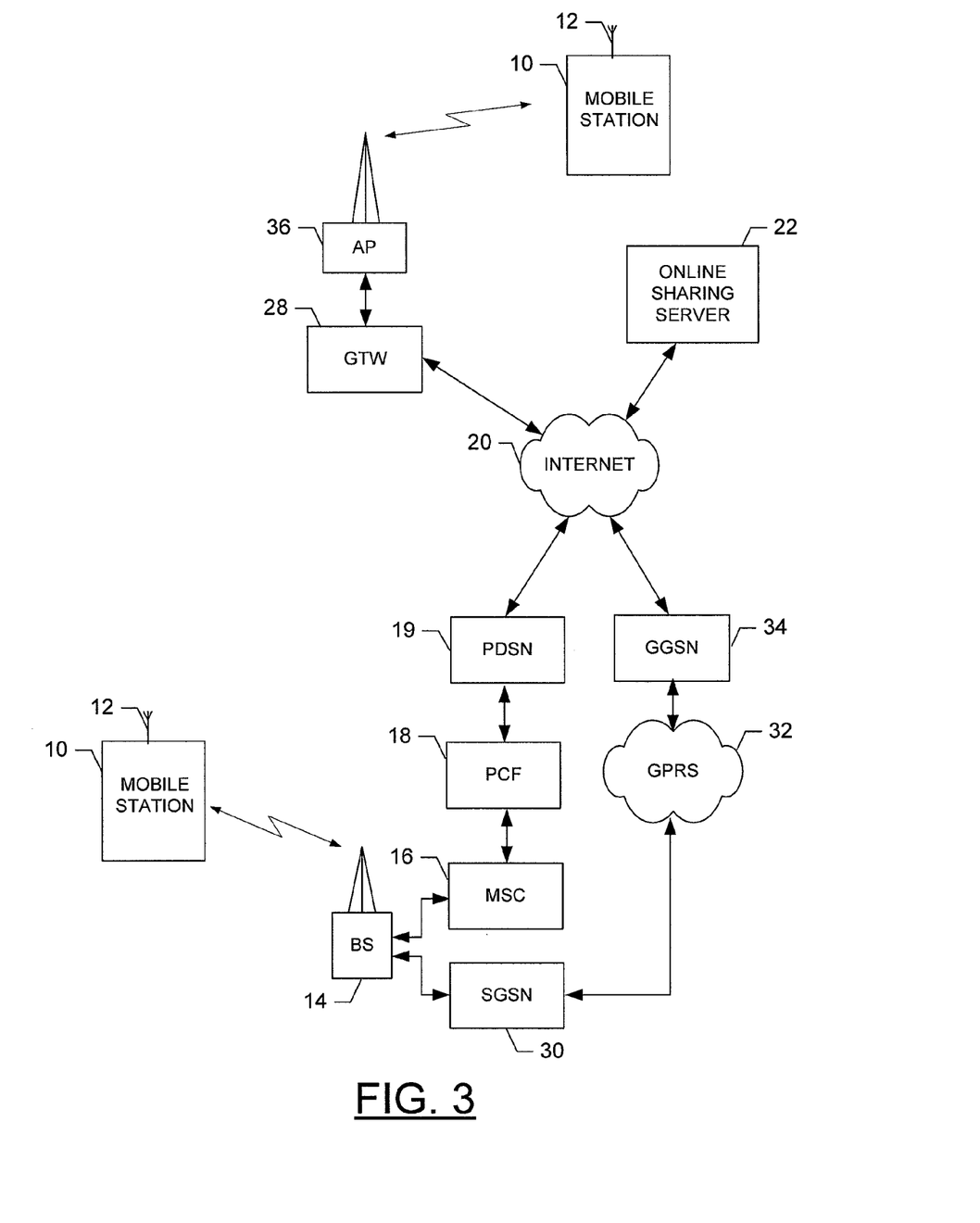
FIG. 3 is a block diagram of one type of system that would benefit from exemplary embodiments of the present invention.

Overall System and Electronic Device:

Referring to FIG. 3, a more detailed illustration of one type of system that would benefit from exemplary embodiments of the present invention is provided. As shown in FIG. 3, the system can include one or more electronic devices 10, each having an antenna 12 for transmitting signals to and for receiving signals from one or more base stations (BS's) 14. The base station is a part of one or more cellular or mobile networks that each includes elements required to operate the network, such as one or more mobile switching centers (MSC) 16. As well known to those skilled in the art, the mobile network may also be referred to as a Base Station/MSC/Interworking function (BMI). In operation, the MSC is capable of routing calls, data or the like to and from mobile stations when those mobile stations are making and receiving calls, data or the like. The MSC can also provide a connection to landline trunks when mobile stations are involved in a call.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a Packet Control Function (PCF) 18, and the PCF is coupled to a Packet Data Serving Node (PDSN) 19, which is in turn coupled to a WAN, such as the Internet 20. In turn, devices such as processing elements (e.g., personal computers, server computers or the like) can be coupled to the electronic device 10 via the Internet. For example, the processing elements can include the Online Sharing Server 22, discussed above with regard to FIGS. 1 and 2 and below with regard to FIG. 4. As will be appreciated, the processing elements can comprise any of a number of processing devices, systems or the like capable of operating in accordance with embodiments of the present invention.

The BS 14 can also be coupled to a signaling GPRS (General Packet Radio Service) support node (SGSN) 30. As known to those skilled in the art, the SGSN is typically capable of performing functions similar to the MSC 16 for packet switched services. The SGSN, like the MSC, can be coupled to a data network, such as the Internet 20. The SGSN can be directly coupled to the data network. In a more typical embodiment, however, the SGSN is coupled to a packet-switched core network, such as a GPRS core network 32. The packet-switched core network is then coupled to another GTW, such as a GTW GPRS support node (GGSN) 34, and the GGSN is coupled to the Internet.

Although not every element of every possible network is shown and described herein, it should be appreciated that the electronic device 10 may be coupled to one or more of any of a number of different networks. In this regard, mobile network(s) can be capable of supporting communication in accordance with any one or more of a number of first-generation (1G), second-generation (2G), 2.5G and/or third-generation (3G) mobile communication protocols or the like. More particularly, one or more mobile stations may be coupled to one or more networks capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. In addition, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrowband AMPS (NAMPS), as well as TACS, network(s) may also benefit from embodiments of the present invention, as should dual or higher mode mobile stations (e.g., digital/analog or TDMA/CDMA/analog phones).

One or more electronic devices 10 (as well as one or more processing elements, although not shown as such in FIG. 3) can further be coupled to one or more wireless access points (APs) 36. The AP's can be configured to communicate with the mobile station in accordance with techniques such as, for example, radio frequency (RF), Bluetooth (BT), infrared (IrDA) or any of a number of different wireless networking techniques, including Wireless LAN (WLAN) techniques. The APs may be coupled to the Internet 20. Like with the MSC 16, the AP's can be directly coupled to the Internet. In one embodiment, however, the APs are indirectly coupled to the Internet via a GTW 28. As will be appreciated, by directly or indirectly connecting the electronic devices and the processing elements (e.g., Online Sharing Server 22) and/or any of a number of other devices to the Internet, whether via the AP's or the mobile network(s), the mobile stations and processing elements can communicate with one another to thereby carry out various functions of the respective entities, such as to transmit and/or receive data, content or the like. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 3, in addition to or in lieu of coupling the electronic devices 10 to one or more processing elements (e.g., a server associated with the Online Sharing Service) across the Internet 20, one or more such entities may be directly coupled to one another. As such, one or more network entities may communicate with one another in accordance with, for example, RF, BT, IrDA or any of a number of different wireline or wireless communication techniques, including LAN and/or Wireless LAN techniques. Further, the electronic device 10 and the processing elements can be coupled to one or more electronic devices, such as printers, digital projectors and/or other multimedia capturing, producing and/or storing devices (e.g., other terminals).

Figure 4:
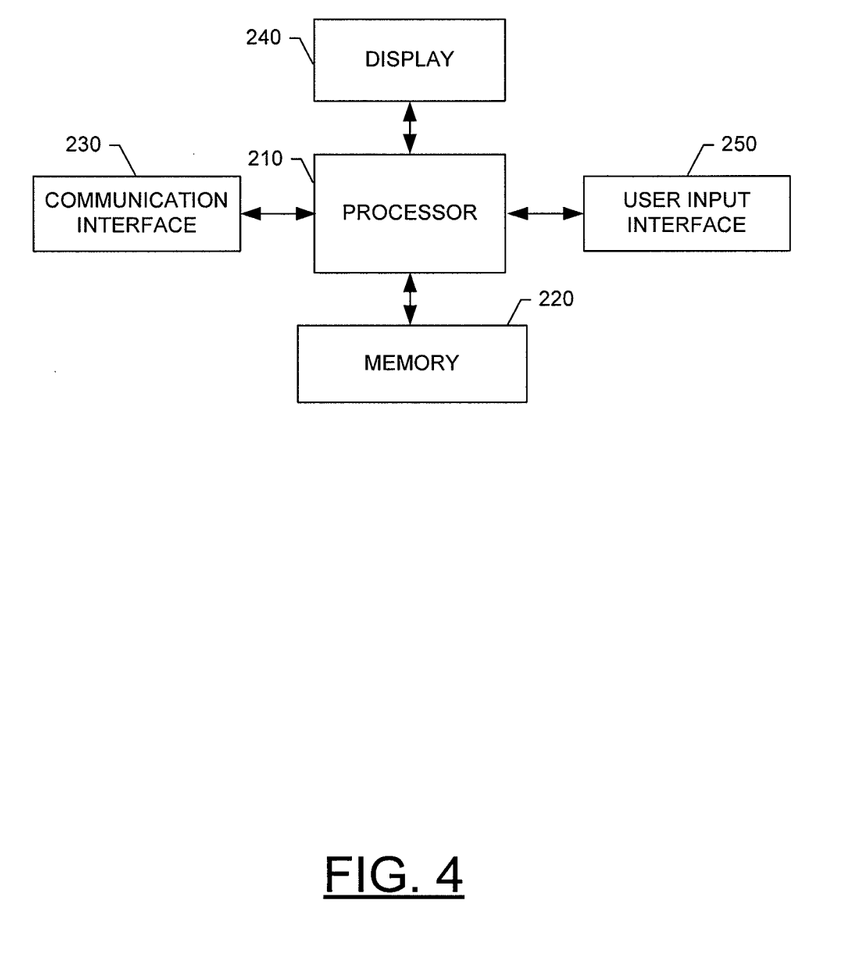
FIG. 4 is a schematic block diagram of an entity capable of operating as an online sharing server in accordance with exemplary embodiments of the present invention.

Referring now to FIG. 4, a block diagram of an entity capable of operating as an Online Sharing Server 22 is shown in accordance with one embodiment of the present invention. The entity capable of operating as an Online Sharing Server 22 includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. As shown, the entity capable of operating as an Online Sharing Server 22 can generally include means, such as a processor 210 connected to a memory 220, for performing or controlling the various functions of the entity. These functions may include, for example, those discussed above with regard to FIGS. 1 and 2, such as receiving media objects and corresponding discussions, and displaying those media objects and discussions on a website. The memory can comprise volatile and/or non-volatile memory, and typically stores content, data or the like. For example, the memory typically stores content transmitted from, and/or received by, the entity, such as the media objects and corresponding comments and conversations discussed above. Also for example, the memory typically stores software applications, instructions or the like for the processor to perform steps associated with operation of the entity in accordance with embodiments of the present invention.

In addition to the memory 220, the processor 210 can also be connected to at least one interface or other means for displaying, transmitting and/or receiving data, content or the like. In this regard, the interface(s) can include at least one communication interface 230 or other means for transmitting and/or receiving data, content or the like, as well as at least one user interface that can include a display 240 and/or a user input interface 250. The user input interface, in turn, can comprise any of a number of devices allowing the entity to receive data from a user, such as a keypad, a touch display, a joystick or other input device.

Figure 5:
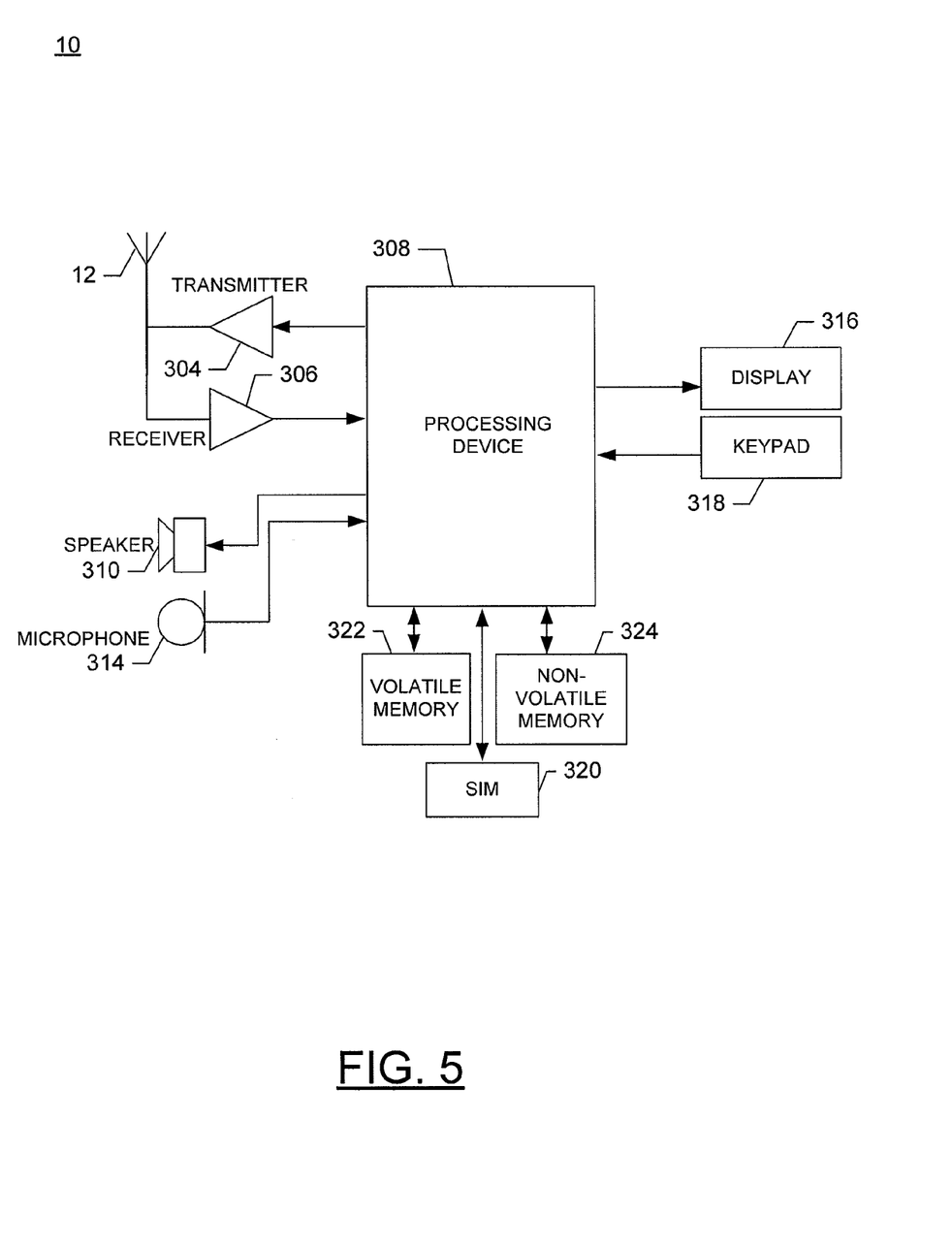
FIG. 5 is a schematic block diagram of electronic device capable of operating in accordance with an exemplary embodiment of the present invention.

Reference is now made to FIG. 5, which illustrates one type of electronic device 10 that would benefit from embodiments of the present invention. As shown, the electronic device may be a mobile station, and, in particular, a cellular telephone. It should be understood, however, that the mobile station illustrated and hereinafter described is merely illustrative of one type of electronic device that would benefit from the present invention and, therefore, should not be taken to limit the scope of the present invention. While several embodiments of the mobile station 10 are illustrated and will be hereinafter described for purposes of example, other types of mobile stations, such as personal digital assistants (PDAs), pagers, laptop computers, as well as other types of electronic systems including both mobile, wireless devices and fixed, wireline devices, can readily employ embodiments of the present invention.

The mobile station includes various means for performing one or more functions in accordance with exemplary embodiments of the present invention, including those more particularly shown and described herein with regard to User A, User A's device 10, User B and User B's device 11. It should be understood, however, that one or more of the entities may include alternative means for performing one or more like functions, without departing from the spirit and scope of the present invention. More particularly, for example, as shown in FIG. 5, in addition to an antenna 302, the mobile station 10 includes a transmitter 304, a receiver 306, and means, such as a processing device 308, e.g., a processor, controller or the like, that provides signals to and receives signals from the transmitter 304 and receiver 306, respectively. These signals include signaling information in accordance with the air interface standard of the applicable cellular system and also user speech and/or user generated data. In this regard, the mobile station can be capable of operating with one or more air interface standards, communication protocols, modulation types, and access types. More particularly, the mobile station can be capable of operating in accordance with any of a number of second-generation (2G), 2.5G and/or third-generation (3G) communication protocols or the like. Further, for example, the mobile station can be capable of operating in accordance with any of a number of different wireless networking techniques, including Bluetooth, IEEE 802.11 WLAN (or Wi-Fi®), IEEE 802.16 WiMAX, ultra wideband (UWB), and the like.

It is understood that the processing device 308, such as a processor, controller or other computing device, may provide means for performing one or more of the functions described herein including, for example, those described in relation to blocks 201-207 of FIG. 2 discussed above. In addition, the processing device 308 includes the circuitry required for implementing the video, audio, and logic functions of the mobile station and is capable of executing application programs for implementing the functionality discussed herein. For example, the processing device may be comprised of various means including a digital signal processor device, a microprocessor device, and various analog to digital converters, digital to analog converters, and other support circuits. The control and signal processing functions of the mobile device are allocated between these devices according to their respective capabilities. The processing device 308 thus also includes the functionality to convolutionally encode and interleave message and data prior to modulation and transmission. The processing device can additionally include an internal voice coder (VC) 308A, and may include an internal data modem (DM) 308B. Further, the processing device 308 may include the functionality to operate one or more software applications, which may be stored in memory. For example, the controller may be capable of operating a connectivity program, such as a conventional Web browser. The connectivity program may then allow the mobile station to transmit and receive Web content, such as according to HTTP and/or the Wireless Application Protocol (WAP), for example.

The mobile station may also comprise means such as a user interface including, for example, a conventional earphone or speaker 310, a ringer 312, a microphone 314, a display 316, all of which are coupled to the controller 308. The user input interface, which allows the mobile device to receive data, can comprise any of a number of devices allowing the mobile device to receive data, such as a keypad 318, a touch display (not shown), a microphone 314, or other input device. In embodiments including a keypad, the keypad can include the conventional numeric (0-9) and related keys (#, *), and other keys used for operating the mobile station and may include a full set of alphanumeric keys or set of keys that may be activated to provide a full set of alphanumeric keys. Although not shown, the mobile station may include a battery, such as a vibrating battery pack, for powering the various circuits that are required to operate the mobile station, as well as optionally providing mechanical vibration as a detectable output.

The mobile station can also include means, such as memory including, for example, a subscriber identity module (SIM) 320, a removable user identity module (R-UIM) (not shown), or the like, which typically stores information elements related to a mobile subscriber. In addition to the SIM, the mobile device can include other memory. In this regard, the mobile station can include volatile memory 322, as well as other non-volatile memory 324, which can be embedded and/or may be removable. For example, the other non-volatile memory may be embedded or removable multimedia memory cards (MMCs), secure digital (SD) memory cards, Memory Sticks, EEPROM, flash memory, hard disk, or the like. The memory can store any of a number of pieces or amount of information and data used by the mobile device to implement the functions of the mobile station. For example, the memory can store an identifier, such as an international mobile equipment identification (IMEI) code, international mobile subscriber identification (IMSI) code, mobile device integrated services digital network (MSISDN) code, or the like, capable of uniquely identifying the mobile device.

The memory can also store content. For example, the memory may store various media objects, such as pictures, videos, audio clips, and the like, that have been created, received and/or downloaded by the user. In addition, the memory may store computer program code for an application and other computer programs. For example, in one embodiment of the present invention, the memory may store computer program code for performing the steps described above with regard to FIG. 2, such as collecting information associated with one or more activities relating to the media objects (e.g., comments or discussions engaged in about the media objects); and linking the information to the media object such that when the media object is uploaded, for example, to an online sharing server 22, at least a part of the information is likewise uploaded. In one exemplary embodiment, the memory may further include the data source 24, discussed above, wherein entries associated with respective media objects and related activities may be stored. In this exemplary embodiment, the memory may further store computer program code for creating these entries in the data source 24.

The system, method, electronic device, apparatus and computer program product of exemplary embodiments of the present invention are primarily described in conjunction with mobile communications applications. It should be understood, however, that the system, method, electronic device, apparatus and computer program product of embodiments of the present invention can be utilized in conjunction with a variety of other applications, both in the mobile communications industries and outside of the mobile communications industries. For example, the system, method, electronic device, apparatus and computer program product of exemplary embodiments of the present invention can be utilized in conjunction with wireline and/or wireless network (e.g., Internet) applications.

Conclusion:

As described above and as will be appreciated by one skilled in the art, embodiments of the present invention may be configured as a system, method, electronic device and apparatus. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Exemplary embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these exemplary embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   providing for storage of a media object on an electronic device;
   providing for storage of information associated with one or more activities relating to the media object on the electronic device;
   linking the information to the media object, wherein the media object and information are stored and linked on the electronic device;
   after linking the information to the media object, receiving a request to transmit the media object to a server;
   providing for transmission of a copy of the media object to a server associated with an online sharing service, wherein upon transmission of the copy of the media object, a copy of the information linked to the media object prior to receiving the request is automatically caused to be transmitted to the server with the copy of the media object without user intervention;
   providing for storage of an address associated with a website hosted by the server in association with the media object stored on the electronic device;
   linking to the media object on the electronic device information associated with one or more additional activities relating to the media object, wherein the one or more additional activities occur subsequent to transmission of the copy of the media object; and
   providing for automatic uploading of a copy of the information associated with the one or more additional activities relating to the media object to the server indicated by the address.

2. The method of claim 1, wherein the one or more activities comprise providing for transmission of a comment associated with the media object, receiving a comment associated with the media object, or a combination thereof.

3. The method of claim 2, wherein the information comprises a comment associated with the media object, a party responsible for making a comment associated with the media object, context information associated with a comment associated with the media object, or a combination thereof.

4. The method of claim 1, wherein providing for storage of information associated with one or more activities relating to the media object further comprises:
   creating a first entry in a data source associated with the media object; and
   creating an additional entry in the data source for respective activities comprising the information associated with the corresponding activity, said additional entry mapped to the first entry.

5. The method of claim 4, wherein the data source is internal to the electronic device storing the media object.

6. The method of claim 4, wherein providing for storage of a reference to the address associated with a website hosted by the server in association with the media object stored on the electronic device further comprises providing for storage of the address associated with the website hosted by the server in the data source mapped to the media object.

7. The method of claim 6 wherein providing for automatic uploading of the copy of the information associated with the one or more additional activities further comprises providing for automatic uploading of the copy of the information associated with the one or more additional activities relating to the media object to the server using the address stored in the data source.

8. The method of claim 7, wherein prior to providing for automatic uploading of the copy of the information associated with an additional activity relating to the media object to the server, said method further comprises:
   authenticating the information to the online sharing service.

9. The method of claim 8, wherein the additional activity comprises receiving a comment associated with the media object, and wherein authenticating the information to the online sharing service comprises authenticating a party responsible for generating the comment.

10. An apparatus comprising:
    at least one processor; and
    at least one memory including computer program code, the at least one memory and the computer program code configured to, with the at least one processor, cause the apparatus to perform at least the following:
    provide for storage of a media object on the apparatus;
    provide for storage of information associated with one or more activities relating to the media object on the apparatus;
    link the information to the media object, wherein the media object and information are stored and linked on the apparatus;
    after linking the information to the media object, receive a request to transmit the media object to a server;
    provide for transmission of a copy of the media object to a server associated with an online sharing service, wherein upon transmission of the copy of the media object, a copy of the information linked to the media object prior to receiving the request is automatically caused to be transmitted to the server with the copy of the media object without user intervention;
    provide for storage of an address associated with a website hosted by the Server in association with the media object stored on the apparatus;
    link to the media object on the apparatus information associated with one or more additional activities relating to the media object, wherein the one or more additional activities occur subsequent to transmission of the copy of the media object; and
    provide for automatic uploading of a copy of the information associated with the one or more additional activities relating to the media object to the server indicated by the address.

11. The apparatus of claim 10, wherein the one or more activities comprise providing for transmission of a comment associated with the media object, receiving a comment associated with the media object, or a combination thereof.

12. The apparatus of claim 11, wherein the information comprises a comment associated with the media object, a party responsible for making a comment associated with the media object, context information associated with a comment associated with the media object, or a combination thereof.

13. The apparatus of claim 10, wherein in order to provide for storage of information associated with one or more activities relating to the media object, the at least one memory and the computer program code are further configured to, with the at least one processor, cause the apparatus to:
    create a first entry in a data source associated with the media object; and create an additional entry in the data source for respective activities comprising the information associated with the corresponding activity, said additional entry mapped to the first entry.

14. The apparatus of claim 13, wherein providing for storage of a reference to the address associated with a website hosted by the server in association with the media object stored on the apparatus further comprises providing for storage of the address associated with the website hosted by the server in the data source mapped to the media object.

15. The apparatus of claim 14, wherein providing for automatic uploading of the copy of the information associated with the one or more additional activities further comprises providing for automatic uploading of the copy of the information associated with the one or more additional activities relating to the media object to the server using the address stored in the data source.

16. The apparatus of claim 15, wherein the at least one memory and the computer program code are further configured to, with the at least one processor, cause the apparatus to: authenticate the information to the online sharing service prior to providing for automatic uploading of the copy of the information associated with an additional activity relating to the media object to the server.

17. The apparatus of claim 16, wherein the additional activity comprises receiving a comment associated with the media object, and wherein in order to authenticate the information to the online sharing service, the at least one memory and the computer program code are further configured to, with the at least one processor, cause the apparatus to: authenticate a party responsible for generating the comment.

18. A computer program product, wherein the computer program product comprises at least one non-transitory computer-readable storage medium having computer-readable program code portions stored therein, the computer-readable program code portions comprising:
a first executable portion for providing for storage of a media object on an electronic device;
a second executable portion for providing for storage of information associated with one or more activities relating to the media object on the electronic device;
a third executable portion for linking the information to the media object, wherein the media object and information are stored and linked on the electronic device;
a fourth executable portion for receiving a request, after linking the information to the media object, to transmit the media object to a server;
a fifth executable portion for providing for transmission of a copy of the media object to a server associated with an online sharing service, wherein upon transmission of the copy of the media object, a copy of the information linked to the media object prior to receiving the request is automatically caused to be transmitted to the server with the copy of the media object without user intervention;
a sixth executable portion for providing for storage of an address associated with a website hosted by the server in association with the media object stored on the electronic device;
a seventh executable portion for linking to the media object on the electronic device information associated with one or more additional activities relating to the media object, wherein the one or more additional activities occur subsequent to transmission of the copy of the media object; and
an eighth executable portion for providing for automatic uploading of a copy of the information associated with the one or more additional activities relating to the media object to the server indicated by the address.

19. The computer program product of claim 18, wherein the one or more activities comprise providing for transmission of a comment associated with the media object, receiving a comment associated with the media object, or a combination thereof, and wherein the information comprises a comment associated with the media object, a party responsible for making a comment associated with the media object, context information associated with a comment associated with the media object, or a combination thereof.

20. The computer program product of claim 18, wherein the second executable portion is further configured to:
create a first entry in a data source associated with the media object; and
create an additional entry in the data source for respective activities comprising the information associated with the corresponding activity, said additional entry mapped to the first entry.

21. The computer program product of claim 20, wherein providing for storage of a reference to the address associated with a website hosted by the server in association with the media object stored on the electronic device further comprises providing for storage of the address associated with the website hosted by the server in the data source mapped to the media object.

22. The computer program product of claim 21, wherein the eighth executable portion further comprises providing for automatic uploading of the copy of the information associated with the one or more additional activities relating to the media object to the server using the address stored in the data source.

23. The computer program product of claim 22, wherein the computer-readable program code portions further comprise:
a tenth executable portion for authenticating the information to the online sharing service prior to providing for automatic uploading of the copy of the information associated with an additional activity relating to the media object to the server.

24. A system comprising:
a data source;
a server associated with an online sharing service configured to receive information from the data source; and
an electronic device configured to collect information associated with one or more activities relating to a media object and to provide for storage of the media object and the information in the data source such that the information is linked to the media object, said electronic device further configured to receive a request, after linking the information to the media object, to upload the media object to a server; and provide for upload of a copy of the media object to the server, wherein a copy of the information stored in the data source linked to the media object prior to receiving the request is automatically uploaded with the copy of the media object without user intervention, said electronic device further configured to provide for storage of an address associated with a website hosted by the server; link to the media object information associated with one or more additional activities relating to the media object, wherein the one or more additional activities occur subsequent to transmission of the copy of the media object; and provide for automatic uploading of a copy of the information associated with the one or more additional activities relating to the media object to the server indicated by the address.

25. The system of claim 24, wherein the data source is internal to the electronic device.

26. The system of claim 24, wherein in order to collect information associated with one or more activities relating to the media object and to direct storage of the information in the data source such that the information is linked to the media object, the electronic device is further configured to:
   create a first entry in the data source associated with the media object; and
   create an additional entry in the data source for respective activities comprising the information associated with the corresponding activity, said additional entry mapped to the first entry.

27. The system of claim 26, wherein the electronic device is further configured to:
   authenticate the information to the online sharing service prior to providing for automatic uploading of the copy of the information associated with an additional activity relating to the media object to the server.

28. An apparatus comprising:
   means for directing storage of a media object on the apparatus;
   means for directing storage of information associated with one or more activities relating to the media object on the apparatus;
   means for linking the information to the media object, wherein the media object and information are stored and linked on the apparatus;
   means for receiving a request, after linking the information to the media object, to transmit the media object to a server;
   means for providing for transmission of a copy of the media object to a server associated with an online sharing service, wherein upon transmission of the copy of the media object, a copy of the information linked to the media object prior to receiving the request is automatically caused to be transmitted to the server with the copy of the media object without user intervention;
   means for providing for storage of an address associated with a website hosted by the server in association with the media object stored on the apparatus;
   means for linking to the media object on the apparatus information associated with one or more additional activities relating to the media object, wherein the one or more additional activities occur subsequent to transmission of the copy of the media object; and
   means for providing for automatic uploading of a copy of the information associated with the one or more additional activities relating to the media object to the server indicated by the address.

29. The apparatus of claim 28, wherein the means for directing storage of information associated with one or more activities relating to the media object further comprises:
   means for creating a first entry in a data source associated with the media object; and
   means for creating an additional entry in the data source for respective activities comprising the information associated with the corresponding activity, said additional entry mapped to the first entry.

30. The apparatus of claim 29, wherein providing for storage of a reference to the address associated with a website hosted by the server in association with the media object stored on the apparatus further comprises providing for storage of the address associated with the website hosted by the server in the data source mapped to the media object.

31. The apparatus of claim 30 wherein means for providing for automatic uploading of the copy of the information associated with the one or more additional activities further comprise means for providing for automatic uploading of the copy of the information associated with the one or more additional activities relating to the media object to the server using the address stored in the data source.

32. The apparatus of claim 31 further comprising:
   means for authenticating the information to the online sharing service prior to providing for automatic uploading of the copy of the information associated with an additional activity relating to the media object to the server.

33. The apparatus of claim 32, wherein the additional activity comprises receiving a comment associated with the media object, and wherein the means for authenticating the information to the online sharing service comprises means for authenticating a party responsible for generating the comment.

* * * * *